(12) United States Patent
Diosi et al.

(10) Patent No.: US 7,985,155 B2
(45) Date of Patent: Jul. 26, 2011

(54) PLANETARY TRANSMISSION WITH A DISK CLUTCH OR A DISK BRAKE

(75) Inventors: Gabor Diosi, Friedrichshafen (DE); Josef Haupt, Tettnang (DE); Martin Brehmer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 615 days.

(21) Appl. No.: 12/114,906

(22) Filed: May 5, 2008

(65) Prior Publication Data

US 2008/0293536 A1 Nov. 27, 2008

(30) Foreign Application Priority Data

May 23, 2007 (DE) .......................... 10 2007 023 953

(51) Int. Cl.
F16H 57/04 (2010.01)
(52) U.S. Cl. ........................ 475/160; 475/331
(58) Field of Classification Search .................. 384/623; 475/159, 160, 331
See application file for complete search history.

(56) References Cited

U.S. PATENT DOCUMENTS

| | | | | |
|---|---|---|---|---|
| 4,166,662 A | * | 9/1979 | Chiba et al. | 384/622 |
| 4,225,200 A | * | 9/1980 | Dougall | 384/621 |
| 4,466,751 A | * | 8/1984 | Higuchi | 384/126 |
| 4,714,146 A | * | 12/1987 | Moroto et al. | 192/48.614 |
| 4,901,602 A | * | 2/1990 | Matoba | 475/335 |
| 5,591,099 A | * | 1/1997 | Tsukamoto et al. | 475/318 |
| 6,481,553 B1 | | 11/2002 | Lee | |
| 6,645,111 B2 | | 11/2003 | Ohkubo et al. | |
| 7,104,699 B2 | * | 9/2006 | Shattuck et al. | 384/621 |
| 7,578,764 B2 | * | 8/2009 | Brown et al. | 475/331 |
| 2007/0249460 A1 | | 10/2007 | Schulz et al. | |

FOREIGN PATENT DOCUMENTS

| | | |
|---|---|---|
| DE | 2508677 | 2/1975 |
| DE | 41 36 040 C1 | 1/1993 |
| DE | 102004006723 | 2/2004 |
| DE | 102005026617 | 8/2006 |
| EP | 1094249 A2 | 4/2001 |

* cited by examiner

*Primary Examiner* — Justin Holmes
(74) *Attorney, Agent, or Firm* — Davis & Bujold, P.L.L.C.

(57) ABSTRACT

A transmission with a planetary gearset including planetary gears supported on a carrier, with a disk clutch or brake including a disk carrier which, via an integral cylindrical portion, is fixed to a shaft that supports the disk carrier, such that the carrier rotates on the cylindrical portion and the carrier is supported by a first axial bearing on the disk carrier and a second axial bearing on a sun gear, which engages the planetary gears, and with an oil supply for lubricating and/or cooling bearings, disk clutch and/or brake components. The first axial bearing includes rollers guided in a cage and first check-disk adjacent the carrier and a second check-disk rollers. The first check-disk flanged disk with a section for rollers of the first axial bearing and with a cylindrical section offset from the rolling section.

23 Claims, 2 Drawing Sheets

PLANETARY TRANSMISSION WITH A DISK CLUTCH OR A DISK BRAKE

This application claims priority from German Application Serial No. 10 2007 023 953.1 filed May 23, 2007.

FIELD OF THE INVENTION

This invention concerns a planetary transmission with a disk clutch or a disk brake.

BACKGROUND OF THE INVENTION

Planetary transmissions of this type have long been known in the widest variety of forms. For example, DE 41 36 040 C1 describes a planetary transmission with a disk clutch or disk brake and with at least one planetary gearset, which comprises planetary gears mounted to rotate on a planetary gear carrier; these meshing with a radially inner sun gear and with a radially outer ring gear and with a hollow shaft connected in a rotationally fixed to the planetary carrier which, for its part, has a central shaft passing through it and on which the hollow shaft is radially supported by roller bearings. The hollow shaft is supported axially on adjacent components by needle bearings of a usual type. Furthermore, the document proposes oil guiding arrangements or an oil guide device in the form of a separate oil baffle and an oil guide flange of an oil screen cylinder, which direct lubrication oil in a defined manner from an axial lubrication oil duct arranged within the central shaft, through radial oil bores, to the individual bearings and the disk clutch or disk brake.

Against that background, the purpose of the present invention is to propose a further improved planetary transmission of the type in question, with simplified radial and axial mounting of the planetary carrier and an improved lubrication oil supply for the related bearings and for the disk clutch or disk brake.

SUMMARY OF THE INVENTION

According to these a planetary transmission is proposed, with at least one planetary gearset comprising planetary gears mounted to rotate on a planetary gear carrier with a disk clutch or a disk brake comprising an inner disk carrier which, via a cylindrical portion connected integrally therewith, is joined in a rotationally fixed manner to a shaft that supports the inner disk carrier or to some other rotating component of the planetary transmission. The planetary carrier is radially supported to rotate on the cylindrical portion, such that the planetary carrier is further supported axially by way of a first axial bearing on the inner disk carrier and by way of a second axial bearing on a sun gear that meshes with the planetary gears of the at least one planetary gearset and with a lubricating oil supply arrangement for the lubrication and/or cooling of various bearings and disk clutch and/or disk brake components. The first axial bearing consists of at least one group of rollers guided in a cage and a first check-disk adjacent to the planetary carrier and a second check-disk adjacent to the inner disk carrier for the rollers of the roller group. The first check-disk is made as a flanged disk with a radially orientated rolling section for the rollers of the at lest one roller group of the first axial bearing and, radially on the inside, with a cylindrical section offset relative to the rolling section which, for its part, is arranged co-axially with the shaft in a central bore of the planetary carrier, between the latter and the cylindrical portion of the inner disk carrier, forming a radial slide bearing with these.

By way of this arrangement, the cost and complexity for providing a radial mounting of the planetary carrier is reduced, since the first axial bearing or its first check-disk which are, in any case, present and required, functions at the same time as a constituent of a radial slide bearing.

In an advantageous further embodiment of the invention, the cylindrical section of the first check-disk can be pressed into the central bore of the planetary carrier or fitted into it with some clearance. Thus, if there is a clearance fit both between the planetary carrier and the cylindrical section of the first check-disk, and also between the cylindrical section of the first check-disk and the cylindrical portion of the inner disk carrier, the radial slide bearing can be designed so that the relative rotational speed occurring, during the operation of the automatic transmission between the planetary carrier and the inner disk carrier, is distributed between both of those components.

To that extent, the clearance fit can also be adjusted or the radial slide bearing designed such that in operation, the first check-disk moves at a speed between the respective speeds of the planetary carrier and the cylindrical portion of the inner disk carrier. By this measure, the sliding speed on the slide surfaces can advantageously be reduced by up to half.

Advantageously, the first check-disk of the first axial bearing is made as a separately fitted component, which facilitates assembly.

As the invention further provides, there can be arranged an oil guide section radially outside the rolling section of the first check-disk that projects into an annular space formed, between the planetary carrier and the inner disk carrier, for the controlled delivery of lubricating oil or cooling oil radially from the inside outward toward the friction disks of the disk clutch or disk brake.

The invention further provides that the second check-disk of the first axial bearing is connectedly fixed to the cage of the latter so providing a composite component comprising the cage, the group of rollers and the second check-disk, which can be assembled simply and inexpensively.

By way of a cylindrical axial web formed on the second check-disk, the first axial bearing or the composite component thereof can be radially supported on a step in a recess arranged in the end face of the axially adjacent inner disk carrier.

Advantageously, at least the first check-disk consists of a hardened steel sheet to be able to withstand the high loads particularly also in the slide bearing zone.

To satisfy the requirements for a slide bearing, the planetary carrier and/or the inner disk carrier consist of a cast material, preferably an aluminum pressure die-cast material, which is particularly suitable as a slide bearing material when combined with oil lubrication.

Finally, it is proposed that at least the first axial bearing is formed by an axial needle bearing.

BRIEF DESCRIPTION OF THE DRAWINGS

The invention will now be described, by way of example, with reference to the accompanying drawings in which.

DETAILED DESCRIPTION OF THE INVENTION

Figure 1:
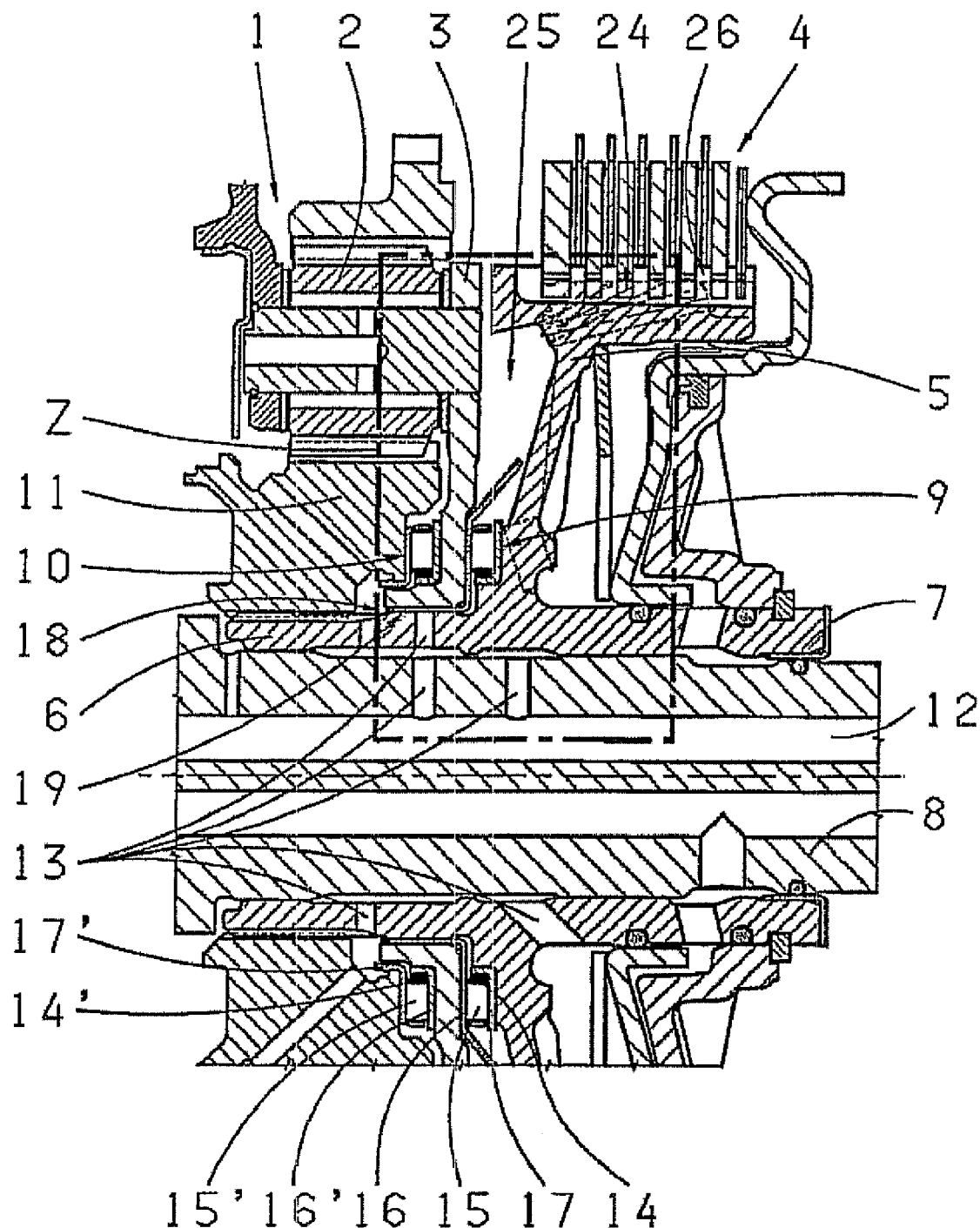
FIG. 1 is a schematic longitudinal section through a planetary transmission constructed in the area of a planetary gearset and a disk clutch or disk brake, according to the invention.
Figure 2:
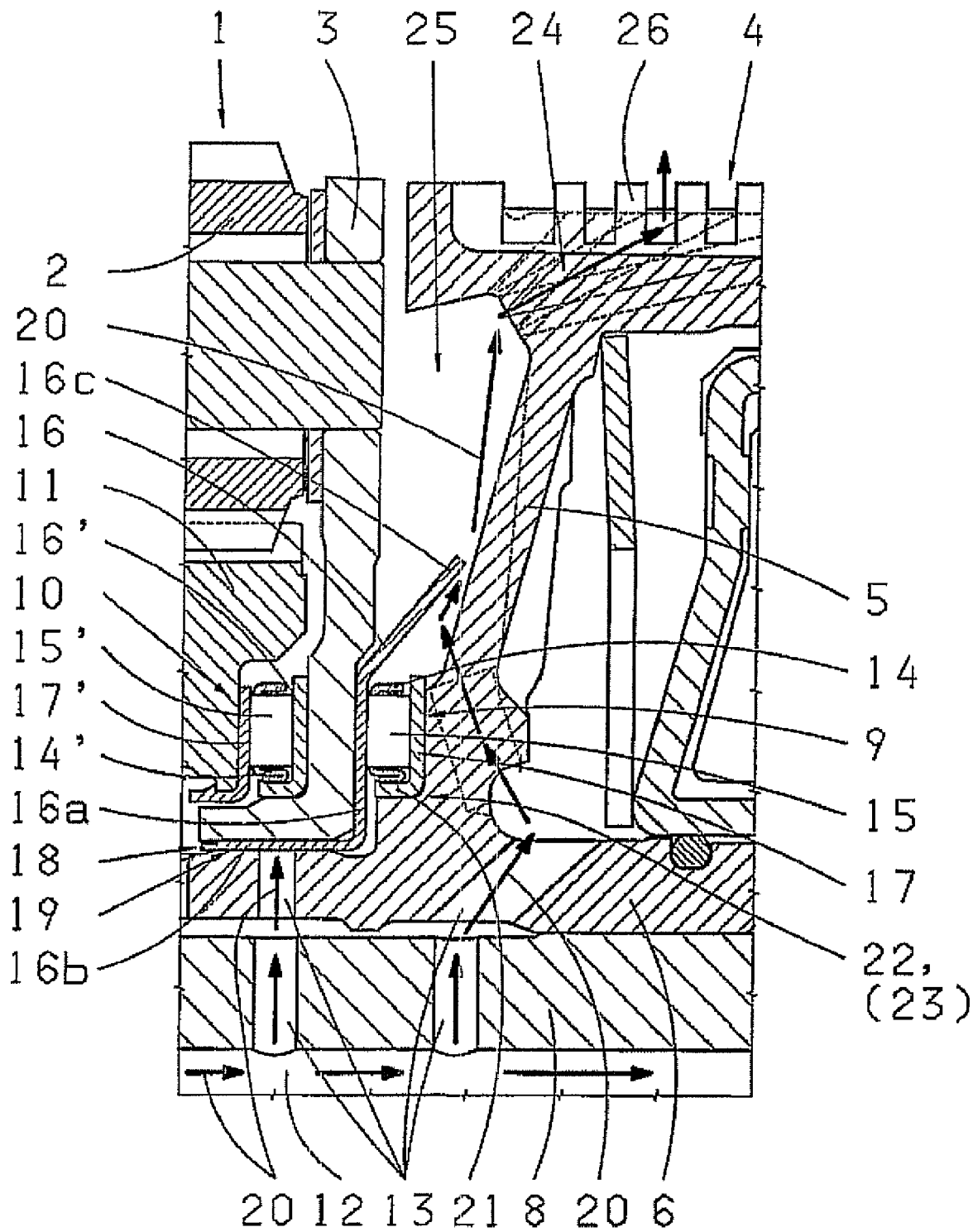
FIG. 2 is an enlarged representation of the area of the transmission relevant for explaining the invention, considering the detail Z in FIG. 1.

FIGS. 1 and 2 show a section of a planetary transmission with at least one planetary gearset 1, whose planetary gears 2 are mounted to rotate on a planetary gear carrier 3 and with a disk clutch 4 or disk brake whose inner disks are fixed onto an inner disk carrier 5.

The inner disk carrier 5 is in drive connection, via a hollow cylindrical portion 6, joined integrally to it and by way of a plug key 7, with a supporting shaft 8, in this case a drive shaft. Further, the planetary carrier 3 is mounted to rotate on and radially supported by the hollow cylindrical portion 6 of the inner disk carrier 5. The planetary carrier 3 is supported axially by a first axial bearing 9 on the inner disk carrier 5 and by a second axial bearing 10 on a sun gear 11 which meshes with the planetary gears 2 of the at least one planetary gearset 1. In addition, lubrication oil supply means with a central lubrication bore 12 inside the shaft 8 and a plurality of largely radially directed bores 13 connected thereto are provided in the shaft 8 and in adjacent components, for the lubrication of various bearing and disk clutch and/or disk brake components.

As FIGS. 1 and 2 also show, the two axial bearings 9 and 10 are made as axial needle bearings with groups of rollers 15, 15' guided in a cage 14, 14' and with a first check-disk 16, 17 and a second check-disk 16', 17', on which the rollers of the roller groups 15, 15' roll.

The first axial bearing 9, which supports the planetary carrier 3 on the inner disk carrier 5, has the first check-disk 16 adjacent to the planetary carrier 3, which is formed as a flanged disk with a radial rolling section 16a for the rollers of the at least one roller group 15 and, radially inside, with a cylindrical section 16b offset relative to the rolling section 16a (FIG. 2). This cylindrical section 16b of the check-disk 16 is arranged co-axially with the shaft 8 in a central bore 18 of the planetary carrier 3, between the latter and the cylindrical portion 6 of the inner disk carrier 5' and, with these, forms a slide bearing 19 which is supplied with lubrication oil 20 via the radial bore 13 of the lubrication oil 20 supply within the shaft 8 and the cylindrical portion 6 of the inner disk carrier 5. Accordingly, the check-disk 16 performs a dual function. Besides being an axial bearing, it also serves as a radial bearing in the planetary transmission.

With a view to convenient assembly of the planetary transmission, it has been found expedient to make the first check-disk 16 of the first axial bearing 9 as a separate component and press it with its cylindrical section 16b into the central bore 18 of the planetary carrier 3 or fit it into the latter with some clearance, far enough to bring the rolling section 16a axially in contact with the planetary carrier 3. Investigations have shown that it is particularly advantageous to adjust the clearance fit, both between the planetary carrier 3 and the cylindrical section 16b of the first check-disk 16 of the first axial bearing 9 and also between the cylindrical section 16b of the first check-disk 16 and the cylindrical portion 6 of the inner disk carrier 5, such that the design of the slide bearing 19 enables the relative rotational speed occurring between the planetary carrier 3 and the inner disk carrier 5 during the operation of the planetary transmission to be distributed between both of these two components.

Preferably in this case, the clearance fits are adjusted and the radial slide bearing 19 is designed such that, during operation, the first check-disk 16 rotates at a speed between the speeds of the planetary carrier 3 and the cylindrical portion 6 of the inner disk carrier 5. The cylindrical section 16b of the first check-disk 16 will then float by virtue of the oil lubrication 20 between the planetary carrier 3 and the cylindrical portion 6 of the inner disk carrier 5 and by a particular choice of materials this can advantageously be encouraged still further.

The investigations have also shown that a hardened steel sheet is advantageous for the first check-disk 16 and for the planetary carrier 3 and the inner disk carrier 5 slide bearing materials. Suitable cast materials, such as aluminum pressure die-castings, are best. As already described above, the measures indicated make it possible to reduce the sliding speed on the sliding surfaces of the components constituting the slide bearing 19 by up to half compared with conventional slide bearings.

As regards the second check-disk 17 of the first axial bearing 9, this is made as a flanged disk with an annular axial web 21 and a radial axial web in a fixed connection with the cage 14 of the first axial bearing 9, welded thereto, where a composite component comprising the cage 141 the group of rollers 15 and the second check-disk 17 is created.

This composite component can be connected conveniently to the inner disk carrier 5 in that the annular axial web 21 of the second check-disk 17 can be pushed axially over a step 22 corresponding to it in a recess 23 located in the end face of the inner disk carrier 5 and is accordingly radially supported on the step 22.

In contrast, the second axial bearing 10, associated with the sun gear 11, has two check-disks 16' and 17' in the form of conventional flanged disks which, for their part, are supported on corresponding outer contours of the planetary carrier 3 and the sun gear 11.

To enable effective delivery of the volume flow of lubrication oil 20 needed for lubrication of the bearings 9, 10 and cooling of the disk clutch 4 or a disk brake, and provided by the already mentioned lubrication oil supply system, to a corresponding system of bores 24 in the inner disk carrier 5 for oil routing, an oil guiding section 16c connected radially outside to the rolling section 16a of the first check-disk 16 of the first axial bearing 9 and projecting into an annular space 25 formed between the planetary carrier 3 and the inner disk carrier 5 is provided for the controlled delivery of the lubrication oil 20, radially from the inside outward, to friction disks 26. As shown clearly in FIG. 2, this oil guiding section 16c extends both radially and axially in the direction toward the friction disks 26.

The oil guiding section 16c is preferably made integrally with the check-disk 16 and, depending on the design of the planetary transmission, can be configured in its radial extension and its inclination toward the inner disk carrier 5 at a suitable angle, such that it influences the volume flow advantageously as desired. Essentially, this measure prevents lubrication oil 20, beyond a certain and unavoidable amount, from being expelled centrifugally through the annular space 25 and accordingly no longer being available for optimum cooling of the friction disks 26.

Expediently, assembly of the planetary transmission is carried out in accordance with the "tower assembly" method, known as such, essentially as follows.

First, a previously assembled planetary carrier group consisting of the planetary carrier 3, the planetary gears 2, the second axial bearing 10, the sun gear 11 and other transmission components (not shown here), as necessary, is fitted with the first check-disk 16 of the first axial bearing 9. Then, the inner disk carrier 5 fitted with the composite component comprising the first axial bearing 9 consisting of the cage 14, the roller group 15 and the second check-disk 17, together with any other fitted components (not shown), can be axially connected to the previously assembled planetary gear carrier 3, described above, where the first axial bearing 9 with the first check-disk 16 is brought in contact therewith and can therefore perform its function as a bearing.

REFERENCE NUMERALS 1 planetary gearset
2 planetary gears
3 planetary gear carrier
4 disk clutch
5 inner disk carrier
6 cylindrical portion of the inner disk carrier 5
7 plug key
8 shaft
9 first axial bearing
10 second axial bearing
11 sun gear
12 central lubrication bore
13 bores
14, 14' cage
15, 15' groups of rollers
16, 16' first check-disk
16a rolling section
16b cylindrical section
16c oil guiding section
17, 17' second check-disk
18 central bore in the planetary carrier 3
19 slide bearing
20 lubrication oil
21 axial web
22 step
23 recess
24 bore system in the inner disk carrier 5
25 annular space
26 friction disks of the disk clutch 4

The invention claimed is:

1. A planetary transmission having at least one gearset (1) comprising planetary gears (2) mounted for rotation on a planetary gear carrier (3) with one of a disk clutch and a disk brake (4) comprising an inner disk carrier (5) which, via a cylindrical portion (6) integrally connected thereto, being connected in a rotationally fixed manner to a shaft (8) that supports one of the inner disk carrier (5) and another rotating component of the planetary transmission, such that the planetary carrier (3) is radially supported for rotation on the cylindrical portion (6), and further, such that the planetary carrier (3) being axially supported by a first axial bearing (9), on the inner disk carrier (5), and a second axial bearing (10), on a sun gear (11) which meshes with the planetary gears (2) of the at least one planetary gearset (1), and with a lubrication oil supply for lubricating and cooling bearings and the one of the disk clutch and the disk brake components, such that the first axial bearing (9) comprises at least one group of rollers (15) guided in a cage (14) and a first check-disk (16) located adjacent the planetary carrier (3) and the inner disk carrier (5) and a second check-disk (17) for the at least one group of rollers (15), and such that the first check-disk (16) is a flanged disk with a radially orientated rolling section (16a) for the at least one roller group (15) of the first axial bearing (9) and, radially inside, with a cylindrical section (16b) offset relative to the rolling section (16a), the cylindrical section (16b) being arranged co-axially with the shaft (8) in a central bore (18) of the planetary carrier (3), between the central bore (18) and the cylindrical portion (6) of the inner disk carrier (5), to form a slide bearing (19) with the cylindrical portion (6), the sun gear (11) being rotationally fixed to and directly radially supported on the cylindrical portion (6) of the inner disk carrier (5), the cylindrical portion (6) of the inner disk carrier (5) being integral with the inner disk carrier (5) and being rotationally fixed to and radially supported on the shaft (8).

2. The planetary transmission according to claim 1, wherein the cylindrical section (16b) of the first check-disk (16) is one of pressed into the central bore (18) of the planetary carrier (3) or fitted in the central bore (18) of the planetary carrier (3) with clearance.

3. The planetary transmission according to claim 2, wherein the clearance both between the planetary carrier (3) and the cylindrical section (16b) of the first check-disk (16) and between the cylindrical section (16b) of the first check-disk (16) and the cylindrical portion (6) of the inner disk carrier (5) facilitates a distribution of relative rotational speed, occurring during operation of the planetary transmission, between the planetary carrier (3) and the inner disk carrier (5), via the radial slide bearing (19).

4. The planetary transmission according to claim 3, wherein the slide bearing (19) is arranged such that, during operation of the planetary transmission, the first check-disk (16) rotates at a rotational speed that is between respective rotational speeds of the planetary carrier (3) and the cylindrical portion (6) of the inner disk carrier (5).

5. The planetary transmission according to claim 1, wherein the first check-disk (16) of the first axial bearing (9) is a component that is fitted separately to the planetary transmission.

6. The planetary transmission according to claim 1, wherein an oil guiding section (16c) is connected, radially outside on the rolling section (16a) of the first check-disk (16), and projects into an annular space (25) formed between the planetary carrier (3) and the inner disk carrier (5) for controlling delivery of lubrication oil (20) radially outward toward friction disks (26) of the one of the disk clutch and the disk brake (4).

7. The planetary transmission according to claim 1, wherein the second check-disk (17) of the first axial bearing (9) is fixed with the cage (14) thereof.

8. The planetary transmission according to claim 7, wherein the second check-disk (17) comprises an axial web (21) which radially supports the first axial bearing (9) on a step (22) of a recess (23) located in an end face of the inner disk carrier (5), which is axially adjacent thereto.

9. The planetary transmission according to claim 1, wherein at least the first check-disk (16) is made from a hardened steel.

10. The planetary transmission according to claim 1, wherein at least one of the planetary carrier (3) and the inner disk carrier (5) is made from a cast material.

11. The planetary transmission according to claim 10, wherein at least one of the planetary carrier (3) and the inner disk carrier (5) is made from an aluminum pressure die-cast material.

12. The planetary transmission according to claim 1, wherein at least the first axial bearing (9) is an axial needle bearing.

13. A planetary transmission comprising:
a planetary gearset (1) comprising a sun gear (11), a planetary carrier (3), and a plurality of planetary gears (2) that are rotatably supported on the planetary carrier (3) which is radially, rotationally supported by a cylindrical portion (6) of an inner disk carrier (5), the sun gear (11) being rotationally fixed to and directly radially supported on the cylindrical portion (6) of the inner disk carrier (5);
one of a disk clutch and a disk brake (4) including the inner disk carrier (5), the cylindrical portion (6) of the inner disk carrier (5) being integral with the inner disk carrier (5) and being rotationally fixed to and radially supported on a shaft (8);

a first bearing (9) and a second bearing (10) axially support the planetary carrier (3) therebetween, the first bearing (9) being axially supported by the inner disk carrier (5) and the second bearing (10) being axially supported by the sun gear (11) which engages the planetary gears (2) of the planetary gearset (1);

a lubrication oil supply communicates with at least one of the first bearing (9), the second bearing (10) and components of the one of the disk clutch and the disk brake (4) for at least one of cooling and lubricating;

the first axial bearing (9) comprises a first check-disk (16), a second check-disk (17) and a group of rollers (15) which are driven in a retainer (14); and the first check-disk (16) being located between the planetary carrier (3) and the group of rollers (15) and being a flanged disk with a radially extending rolling section (16a) on which the group of rollers (15) are driven, and a cylindrical section (16b) extending co-axially with the shaft (8) in a central bore (18), the cylindrical section (16b) of the first check-disk (16) being radially supported on the cylindrical portion (6) of the inner disk carrier (5) such that the cylindrical section (16b) of the first check-disk (16) forms a slide bearing (19), the second check-disk (17) comprising an axial web (21) that is located radially between the group of rollers (15) and the cylindrical portion (6) of the inner disk carrier (5), and the cylindrical portion (6) of the inner disk carrier (5) comprises at least one radially extending aperture (13) that is radially aligned with one of the at least one radially extending aperture (13) of the shaft (8), and the cylindrical section (16b) of the first check-disk (16) radially overlays the aperture (13) of the cylindrical portion (6) of the inner disk carrier (5).

14. A planetary transmission having at least one gearset (1) comprising planetary gears (2) that are rotatably supported by a planetary gear carrier (3), one of a disk clutch and a disk brake (4) comprises an inner disk carrier (5) which has a cylindrical portion (6) that is integrally connected thereto, the cylindrical portion (6) of the inner disk carrier (5) is connected in a rotationally fixed manner to a shaft (8) and rotatably supports another rotating component of the planetary transmission, such that the planetary carrier (3) is radially supported for rotation on the cylindrical portion (6), the planetary carrier (3) is axially supported on the inner disk carrier (5) by a first axial bearing (9) and is axially supported on a sun gear (11) by a second axial bearing (10), the sun gear (11) engage the planetary gears (2) of the at least one planetary gearset (1), a lubrication oil supply for lubricating and cooling bearings and components of the one of the disk clutch and the disk brake, such that the first axial bearing (9) comprises at least one group of rollers (15), that are guided in a cage (14), a first check-disk (16), that is located adjacent to and between the planetary carrier (3) and the inner disk carrier (5) and a second check-disk (17) supports the at least one group of rollers (15), and the first check-disk (16) is a flanged disk with a radially orientated rolling section (16a), that axially supports the at least one roller group (15) of the first axial bearing (9), and a radially inner cylindrical section (16b) that is axially offset relative to the rolling section (16a), the cylindrical section (16b) and the shaft (8) are coaxial and axially extend in a central bore (18) of the planetary carrier (3) such that the cylindrical section (16b) of the first check-disk (16) engages with and forms a slide bearing (19) between the cylindrical portion (6) of the inner disk carrier (5) and the planetary carrier (3);

the first check-disk (16) of the first axial bearing (9) is fitted separately to the planetary transmission;

the second check-disk (17) of the first axial bearing (9) is fixed directly to the cage (14) thereof; and the sun gear (11) being rotationally fixed to and directly radially supported on the cylindrical portion (6) of the inner disk carrier (5), the cylindrical portion (6) of the inner disk carrier (5) being integral with the inner disk carrier (5) and being rotationally fixed to and radially supported on the shaft (8).

15. The planetary transmission according to claim 14, wherein the cylindrical section (16b) of the first check-disk (16) is one of pressed into the central bore (18) of the planetary carrier (3) or fitted in the central bore (18) of the planetary carrier (3) with clearance.

16. The planetary transmission according to claim 15, wherein the clearance both between the planetary carrier (3) and the cylindrical section (16b) of the first check-disk (16) and between the cylindrical section (16b) of the first check-disk (16) and the cylindrical portion (6) of the inner disk carrier (5) facilitates a distribution of relative rotational speed, occurring during operation of the planetary transmission, between the planetary carrier (3) and the inner disk carrier (5), via the radial slide bearing (19).

17. The planetary transmission according to claim 14, wherein the slide bearing (19) is arranged such that, during operation of the planetary transmission, the first check-disk (16) rotates at a rotational speed that is between respective rotational speeds of the planetary carrier (3) and the cylindrical portion (6) of the inner disk carrier (5).

18. The planetary transmission according to claim 14, wherein an oil guiding section (16c) is connected, radially outside on the rolling section (16a) of the first check-disk (16), and projects into an annular space (25) formed between the planetary carrier (3) and the inner disk carrier (5) for controlling delivery of lubrication oil (20) radially outward toward friction disks (26) of the one of the disk clutch and the disk brake (4).

19. The planetary transmission according to claim 14, wherein the second check-disk (17) comprises an axial web (21) which radially supports the first axial bearing (9) on a step (22) of a recess (23) located in an end face of the inner disk carrier (5), which is axially adjacent thereto.

20. The planetary transmission according to claim 14, wherein at least the first check-disk (16) is made from a hardened steel.

21. The planetary transmission according to claim 14, wherein at least one of the planetary carrier (3) and the inner disk carrier (5) is made from a cast material.

22. The planetary transmission according to claim 21, wherein at least one of the planetary carrier (3) and the inner disk carrier (5) is made from an aluminum pressure die-cast material.

23. The planetary transmission according to claim 14, wherein at least the first axial bearing (9) is an axial needle bearing.

* * * * *